United States Patent
Michaelis et al.

(10) Patent No.: US 7,356,733 B2
(45) Date of Patent: Apr. 8, 2008

(54) SYSTEM AND METHOD FOR SYSTEM FIRMWARE CAUSING AN OPERATING SYSTEM TO IDLE A PROCESSOR

(75) Inventors: Scott L. Michaelis, Plano, TX (US); Anurupa Rajkumari, Round rock, TX (US); Sylvia K. Myer, Fort Collins, CO (US); Richard D. Powers, Highland Village, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 10/972,888

(22) Filed: Oct. 25, 2004

(65) Prior Publication Data

US 2006/0107115 A1    May 18, 2006

(51) Int. Cl.
 *G06F 11/00* (2006.01)
(52) U.S. Cl. .............................. 714/12; 714/11; 712/31
(58) Field of Classification Search ............ 714/11–13; 712/31
See application file for complete search history.

(56) References Cited

U.S. PATENT DOCUMENTS

| | | | |
|---|---|---|---|
| 5,226,152 A | 7/1993 | Klug et al. | |
| 5,249,188 A | 9/1993 | McDonald | |
| 5,751,932 A | 5/1998 | Horst et al. | |
| 5,758,058 A | 5/1998 | Milburn | |
| 5,764,660 A | 6/1998 | Mohat | |
| 5,915,082 A * | 6/1999 | Marshall et al. | 714/11 |
| 6,065,135 A | 5/2000 | Marshall et al. | |
| 6,148,348 A | 11/2000 | Garnett et al. | |
| 6,473,869 B2 | 10/2002 | Bissett et al. | |
| 6,560,682 B1 | 5/2003 | Miller et al. | |
| 6,604,177 B1 * | 8/2003 | Kondo et al. | 711/150 |
| 6,615,366 B1 | 9/2003 | Grochowski et al. | |
| 6,625,749 B1 * | 9/2003 | Quach | 714/10 |
| 6,675,324 B2 * | 1/2004 | Marisetty et al. | 714/30 |
| 6,687,851 B1 | 2/2004 | Somers et al. | |
| 6,754,787 B2 | 6/2004 | Miller et al. | |
| 6,920,581 B2 * | 7/2005 | Bigbee et al. | 714/10 |
| 7,003,691 B2 * | 2/2006 | Safford et al. | 714/11 |
| 7,085,959 B2 * | 8/2006 | Safford | 714/11 |
| 7,134,047 B2 * | 11/2006 | Quach | 714/11 |
| 7,155,721 B2 * | 12/2006 | Safford et al. | 718/104 |
| 2002/0144177 A1 | 10/2002 | Kondo et al. | |
| 2002/0152420 A1 * | 10/2002 | Chaudhry et al. | 714/11 |
| 2003/0051190 A1 * | 3/2003 | Marisetty et al. | 714/11 |
| 2003/0070050 A1 | 4/2003 | Miller et al. | |

(Continued)

OTHER PUBLICATIONS

Filed concurrently herewith, entitled "System and Method for Maintaining in a Multi-Processor System a Spare Processor That is in Lockstep for Use in Recovering From Loss of Lockstep for Another Processor".

(Continued)

Primary Examiner—Christopher McCarthy

(57) ABSTRACT

According to one embodiment, a method comprises system firmware instructing a system's operating system to idle a processor, and responsive to the instructing, the operating system idling the processor and returning control over the processor to the system firmware. According to one embodiment, a method comprises detecting loss of lockstep (LOL) for a processor module in a system, and responsive to the detecting LOL for the processor module, system firmware instructing an operating system to idle the processor module.

9 Claims, 3 Drawing Sheets

U.S. PATENT DOCUMENTS

| | | | |
|---|---|---|---|
| 2003/0126498 A1* | 7/2003 | Bigbee et al. | 714/10 |
| 2004/0006722 A1* | 1/2004 | Safford | 714/11 |
| 2004/0019771 A1* | 1/2004 | Quach | 712/229 |
| 2004/0078650 A1* | 4/2004 | Safford et al. | 714/11 |
| 2004/0078651 A1* | 4/2004 | Safford et al. | 714/11 |
| 2004/0153857 A1 | 8/2004 | Yamazaki et al. | |

OTHER PUBLICATIONS

Filed concurrently herewith, entitled "System and Method for Establishing a Spare Processor for Recovering From Loss of Lockstep in a Boot Processor".

Filed concurrently herewith, entitled "System and Method for Using Information Relating to a Detected Loss of Lockstep for Determining a Responsive Action".

Filed concurrently herewith, entitled "System and Method for Providing Firmware Recoverable Lockstep Protection".

Filed concurrently herewith, entitled "System and Method for Configuring Lockstep Mode of a Processor Module".

Filed concurrently herewith, entitled "System and Method for Reestablishing Lockstep for a Processor Module for Which Loss of Lockstep is Detected".

Filed concurrently herewith, entitled "System and Method for Reintroducing a Processor Module to an Operating System After Lockstep Recovery".

Filed concurrently herewith, entitled "System and Method for Switching the Role of Boot Processor to a Spare Processor Responsive to Detection of Loss of Lockstep in a Boot Processor".

* cited by examiner

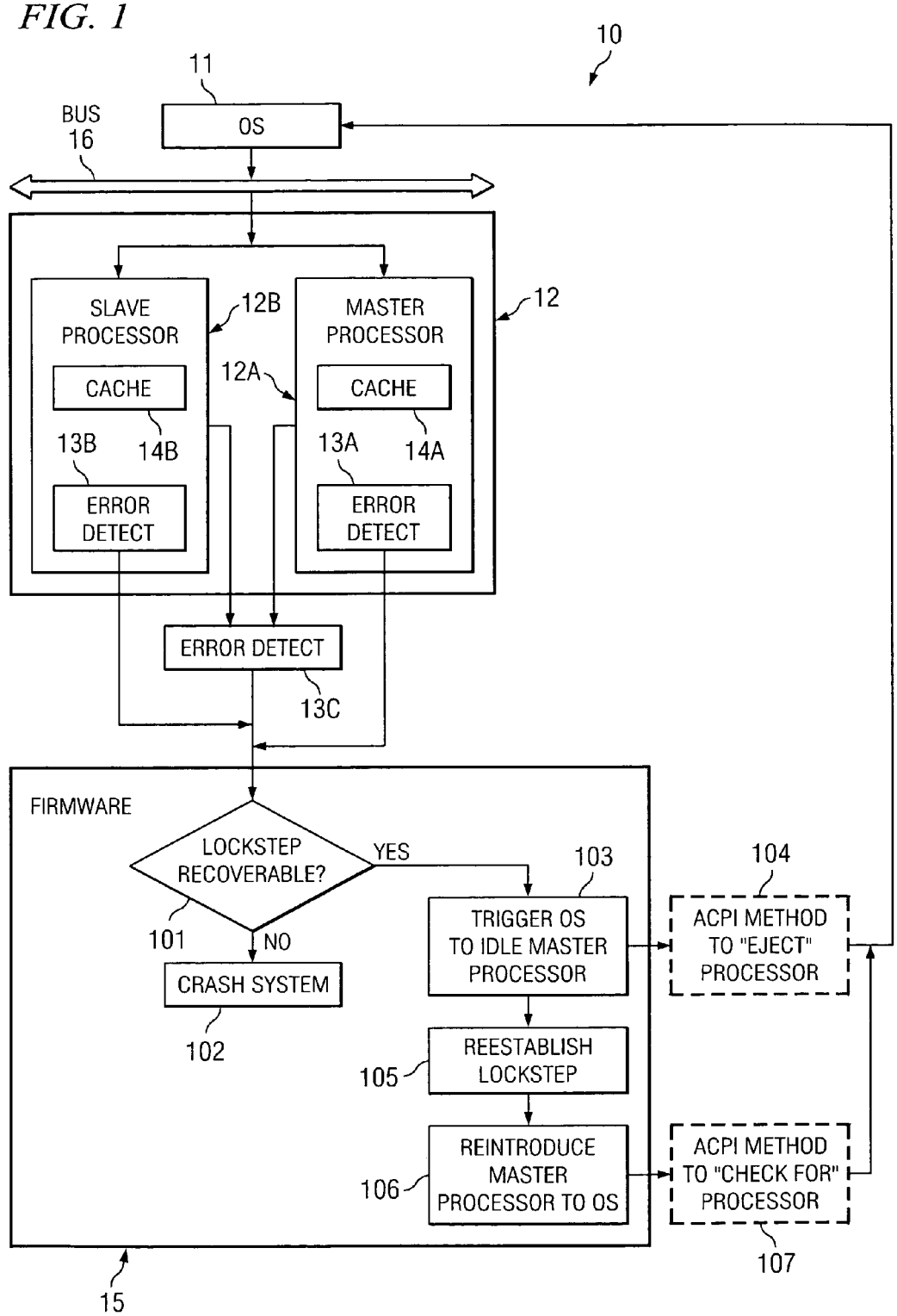

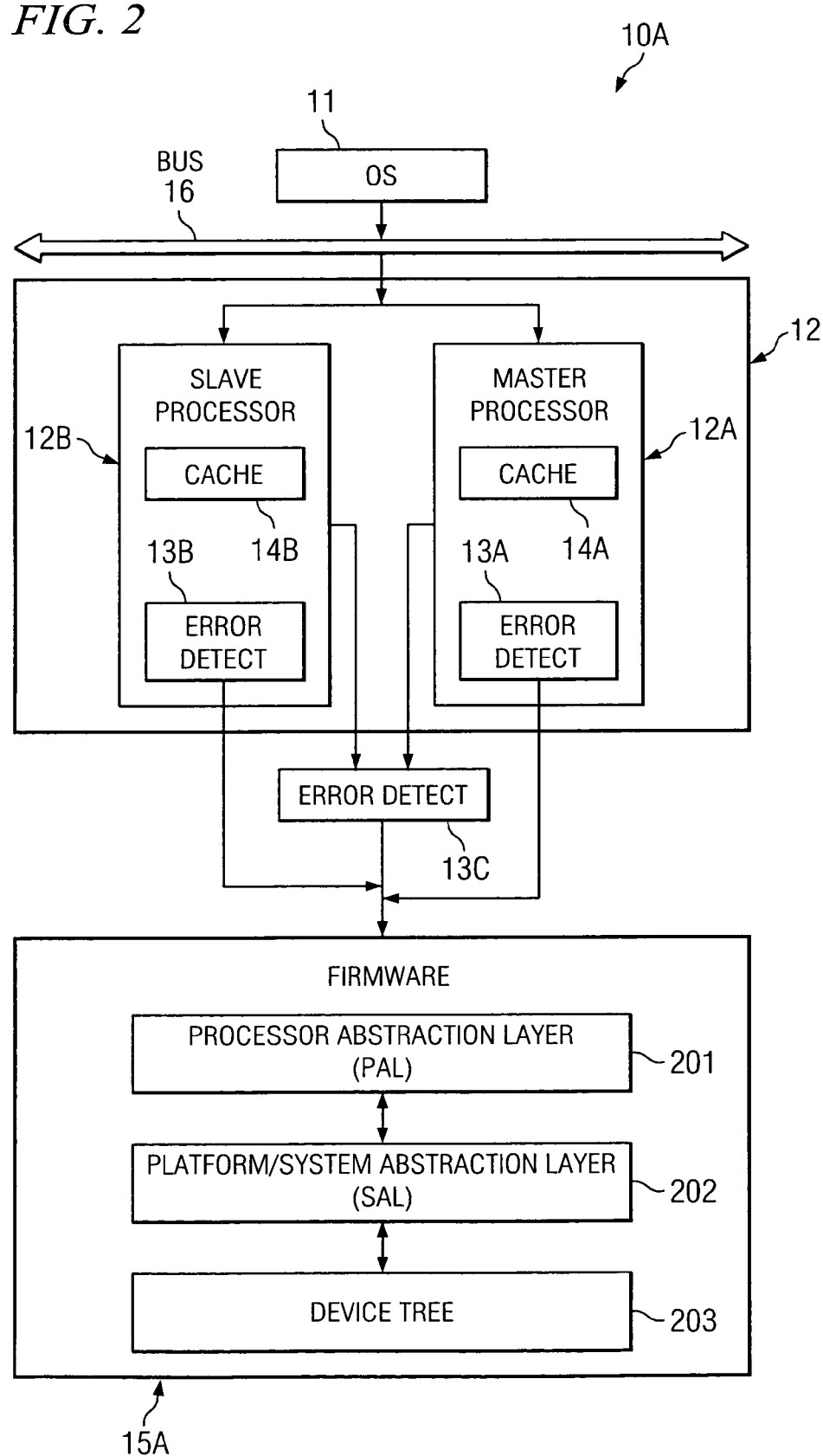

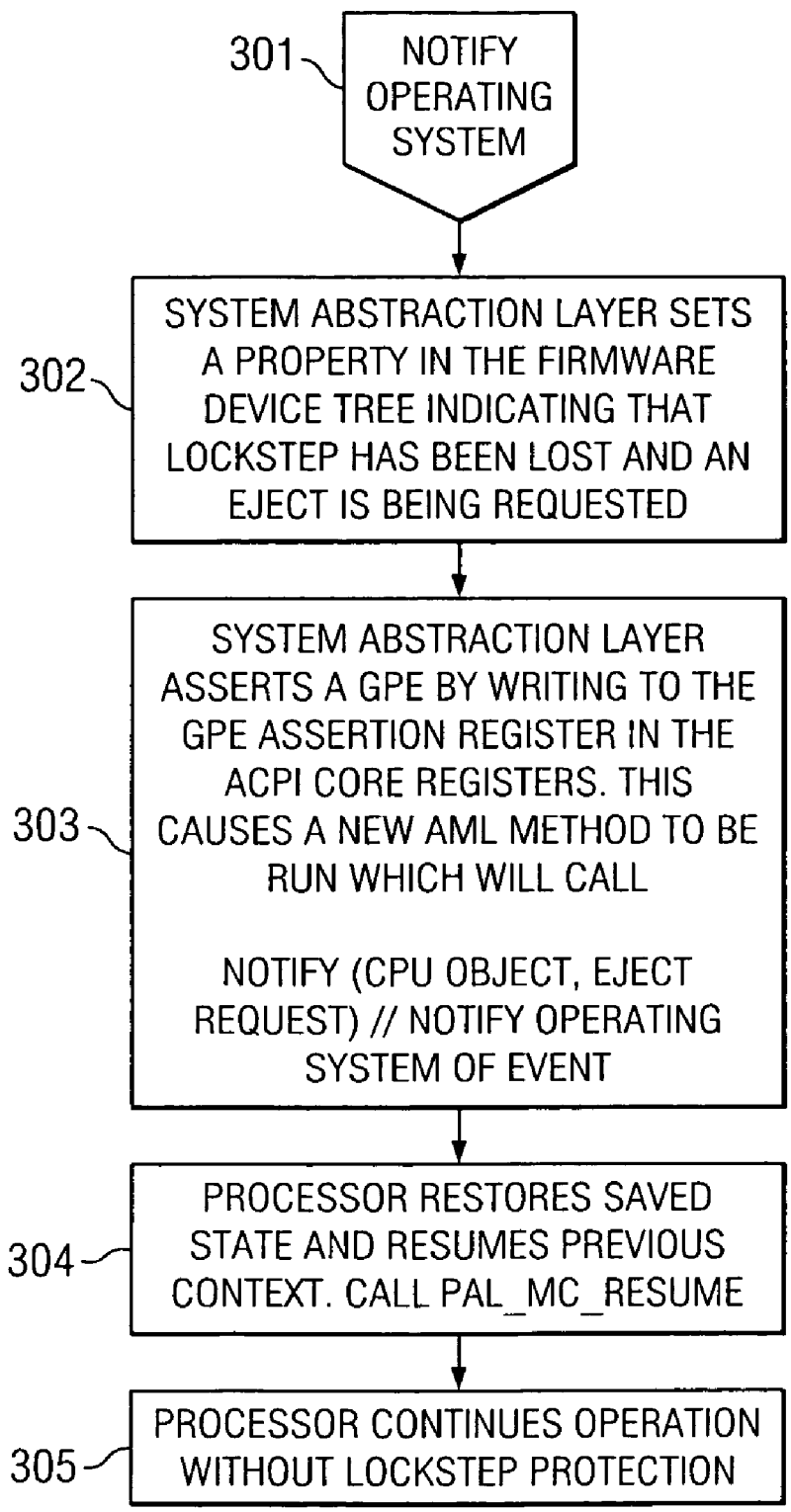

Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR"; Ser. No. 10/973,004 titled "SYSTEM AND METHOD FOR CONFIGURING LOCKSTEP MODE OF A PROCESSOR MODULE"; Ser. No. 10/973,076 titled "SYSTEM AND METHOD FOR PROVIDING FIRMWARE RECOVERABLE LOCKSTEP PROTECTION"; Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED"; Ser. No. 10/972,835 titled "SYSTEM AND METHOD FOR USING INFORMATION RELATING TO A DETECTED LOSS OF LOCKSTEP FOR DETERMINING A RESPONSIVE ACTION"; Ser. No. 10/973,075 titled "SYSTEM AND METHOD FOR REINTRODUCING A PROCESSOR MODULE TO AN OPERATING SYSTEM AFTER LOCKSTEP RECOVERY"; and Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosures of which are hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCs) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same operations and the results are compared (e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to "0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2" (1+1=2), and thus their respective outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. However, the issue then becomes how best for the system to respond to detected LOL. The traditional response to detected LOL has been to crash the system to ensure that the detected error is not propagated through the system. That is, LOL in one pair of lockstep processors in a system halts processing of the system even if other processors that have not encountered an error are present in the system. However, with the increased desire for many systems to maintain high availability, crashing the system each time LOL is detected is not an attractive proposition. This is particularly unattractive for large systems having many processors because cosmic events typically occur more frequently as the processor count goes up, which would result in much more frequent system crashes in those large systems. High availability is a major desire for many customers having large, multi-processor systems, and thus having their system crash every few weeks is not an attractive option. Of course, permitting corrupt data to propagate through the system is also not a viable option.

Prior solutions attempting to resolve at least some detected SDCs without requiring the system to be crashed have been Operating System ("OS") centric. That is, in certain solutions the OS has been implemented in a manner to recover from a detected LOL without necessarily crashing the system. This OS-centric type of solution requires a lot of processor and platform specific knowledge to be embedded in the OS, and thus requires that the OS provider maintain the OS up-to-date as changes occur in later versions of the processors and platforms in which the OS is to be used. This is such a large burden that most commonly used OSs do not support lockstep recovery.

Certain solutions have attempted to recover from a LOL without involving the OS in such recovery procedure. For instance, in one technique upon LOL being detected, firmware is used to save the state of one of the processors in a lockstep pair (the processor that is considered "good") to memory, and then both processors of the pair are reset and reinitialized. Thereafter, the state is copied from the memory to each of the processors in the lockstep pair. This technique makes the processors unavailable for an amount of time without the OS having any knowledge regarding this unavailability, and if the amount of time required for recovery is too long, the system may crash. That is, typically, if a processor is unresponsive for X amount of time, the OS will assume that the processor is hung and will crashdump the system so that the problem can be diagnosed. Further, in the event that a processor in the pair cannot be reset and reinitialized (e.g., the processor has a physical problem and fails to pass its self-test), this technique results in crashing the system.

BRIEF SUMMARY OF THE INVENTION

According to one embodiment, a method comprises system firmware instructing a system's operating system to idle a processor, and responsive to the instructing, the operating system idling the processor and returning control over the processor to the system firmware.

According to one embodiment, a method comprises detecting loss of lockstep (LOL) for a processor module in a system, and responsive to the detecting LOL for the processor module, system firmware instructing an operating system to idle the processor module.

According to one embodiment, a method comprises detecting loss of lockstep (LOL) for a processor module in a system. The method further comprises, responsive to the detecting LOL, generating an interrupt, by system firmware, and, responsive to the interrupt, an operating system idling the processor module.

According to one embodiment, a method comprises detecting loss of lockstep (LOL) for a processor module in a system, and continuing operation of the processor module without lockstep protection.

According to one embodiment, a system comprises a processor, and an operating system for scheduling operations for the processor. The system further comprises system firmware operable to request that the operating system idle the processor.

According to one embodiment, a system comprises means for detecting loss of lockstep (LOL) for a processor module in a system. The system further comprises system firmware including means, responsive to the detecting LOL for the processor module, for instructing an operating system to idle the processor module.

BRIEF DESCRIPTION OF THE DRAWINGS

FIG. 1 shows an example embodiment of a system that uses firmware for instructing an operating system to idle a processor module responsive to detecting a loss of lockstep (LOL) for the processor module;

FIG. 2 shows a block diagram of one embodiment implemented for the IA-64 processor architecture; and FIG. 3 shows an exemplary operational flow diagram of system firmware according to one embodiment for instructing the operating system to idle a processor module responsive to detection of LOL for the processor module.

DETAILED DESCRIPTION OF THE INVENTION

Embodiments are described herein in which system firmware requests that an operating system (OS) idle a processor. Specific examples are described in which the system firmware requests that the OS idle a processor module responsive to detection of LOL for the processor module. Control over the processor module is returned from the OS to the system firmware, and the system firmware can take actions to attempt to recover lockstep for the processor module. However, the embodiments hereof for using system firmware for requesting that the OS idle a processor and return control over such processor to the system firmware are not limited to instances in which LOL is detected for the processor. Rather, the embodiments for using system firmware for requesting that the OS idle a processor and return control over such processor to the system firmware may be utilized for a variety of reasons, including responsive to any processor errors that are not immediately fatal (such as the LOL errors discussed further below), maintenance of the processor, physically moving the processor module to a different system, power failures, etc. Thus, while exemplary embodiments are described herein specifically for instances in which LOL is detected for a processor module, the concept of utilizing the system firmware for causing the OS to idle a processor module and return control thereof to the system firmware is not limited to instances in which LOL is detected for the processor module.

As described further herein and in concurrently filed and commonly assigned U.S. patent application Ser. No. 10/973, 076 titled "SYSTEM AND METHOD FOR PROVIDING FIRMWARE RECOVERABLE LOCKSTEP PROTECTION," the disclosure of which is incorporated herein by reference, certain techniques are provided for recovering from LOL detected for a processor module in a multi-processor system. In using these exemplary techniques, system firmware instructs the system's OS to idle the processor module for which LOL was detected. Control of the processor module is then returned to the system firmware so that the system firmware can take actions to attempt to recover the lockstep. If lockstep is successfully recovered, in certain implementations, the firmware triggers the OS to again recognize the processor module and begin scheduling instructions for it.

Embodiments disclosed herein provide a system and method for instructing an OS to idle the processor module for which a LOL is detected. In certain embodiments, responsive to detecting LOL for a processor module, system firmware uses an ACPI method for instructing the OS to idle (or "eject") the processor module. Thus, the OS is aware that the processor module is not to be used, and the firmware can resume control of the processor module and attempt to recover its lockstep. In certain embodiments, the processor module can continue its operation without lockstep protection, at least until the OS is capable of idling/ejecting the processor module in response to the firmware's ACPI instruction.

Turning to FIG. 1, an example embodiment of a system 10 that includes system firmware 15 that instructs the system's OS 11 to idle a processor module 12 responsive to detection of LOL for such processor module 12. System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Further, lockstep processor pair 12 may be referred to as a processor or CPU "module" because it includes a plurality of processors (12A and 12B) in such module. Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that allows each of such processors to receive the same instructions to process, but such interface only communicates the output of master processor 12A back onto bus 16. The output of slave processor 12B is used solely for checking the output of mater processor 12A. While only one lockstep processor pair 12 is shown for simplicity in the example of FIG. 1, system 10 may include any number of such lockstep processor pairs. As one specific example, system 10 may have 64 lockstep processor pairs, wherein the master processors of the pairs may perform parallel processing for the system.

In this example, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C is also included, which may include an XOR (exclusive OR) gate, for detecting a lockstep mismatch between master processor 12A and slave processor 12B. As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B. A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

Firmware 15 is also included in system 10, which in this embodiment is invoked upon an error being detected by any of the error detect logics 13A, 13B, and 13C. In certain embodiments, processors 12A and 12B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments of firmware for notifying the system's OS of a detected LOL as described herein are not limited in application to an IPF architecture, but may be applied as well to other architectures (e.g., 32-bit processor architectures, etc.).

Processor architecture generally comprises corresponding supporting firmware, such as firmware 15 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG-WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported. While shown as external to the lockstep processor pair 12 in this example, in certain embodiments all or a portion of firmware 15 may be implemented on a common silicon chip with processors 12A and 12B.

In the example embodiment of FIG. 1, upon firmware 15 being invoked responsive to detection of LOL for processor module 12 (by any of error detect logics 13A, 13B, and 13C), firmware 15 instructs OS 11 to idle the processor module 12 and return control over such processor module 12 to the firmware 15. In the specific example of FIG. 1, upon firmware 15 being invoked responsive to detection of LOL for processor module 12, firmware 15 determines, in operational block 101, whether the detected LOL is a recoverable LOL. That is, firmware 15 determines in block 101 whether the detected LOL is of a type from which the firmware can recover lockstep for the lockstep processor pair 12 without crashing the system. If the lockstep is not recoverable from the detected LOL, then in the example of FIG. 1 firmware 15 crashes the system in block 102.

In this example, firmware 15 is implemented in a manner that allows for recovery from certain detected errors without requiring that OS 11 be implemented with specific knowledge for handling such recovery. However, if the lockstep is determined to be recoverable, firmware 15 cooperates with OS 11 via standard OS methods to recover the lockstep. For instance, in the example embodiment of FIG. 1, Advanced Configuration and Power Interface (ACPI) methods are used by firmware 15 to cooperate with OS 11. Accordingly, no processor or platform specific knowledge is required to be embedded in OS 11, but instead any ACPI-compatible OS may be used, including without limitation HP-UX and Open VMS operating systems.

In the example embodiment of FIG. 1, if lockstep is determined to be recoverable in block 101, then firmware 15 triggers OS 11 to idle the master processor 12A in block 103. In this embodiment, firmware 15 utilizes an ACPI method 104 to "eject" master processor 12A, thereby triggering OS 11 to idle the master processor 12A (i.e., stop scheduling tasks for the processor). Of course, by idling master processor 12A, slave processor 12B will in turn be idled. Thus, idling master processor 12A results in idling the lockstep processor pair 12. In this example embodiment, OS 11 is not aware of the presence of slave processor 12B, but is instead aware of master processor 12A. The interface of lockstep processor pair 12 to bus 16 manages copying to slave processor 12B the instructions that are directed by OS 11 to master processor 12A. Thus, firmware 15 need not direct OS 11 to eject slave processor 12B, as OS 11 is not aware of such slave processor 12B in this example implementation. Again, by idling master processor 12A, slave processor 12B is also idled as it merely receives copies of the instructions directed to master processor 12A. Of course, if in a given implementation OS 11 is aware of slave 12B, firmware 15 may be implemented to also direct OS 11 to idle such slave processor 12B in a manner similar to that described for idling master processor 12A.

Firmware 15 then attempts to recover lockstep for the lockstep processor pair 12 in block 105. For instance, firmware 15 resets the processor pair 12. During such reset of processor pair 12, system 10 can continue to operate on its remaining available processors (not shown in FIG. 1).

Once the processor pair 12 is reset and lockstep is recovered, firmware 15 reintroduces master processor 12A to OS 11 in operational block 106. In this embodiment, firmware 15 updates the ACPI device table information for master processor 12A to indicate that such master processor 12A is "present, functioning and enabled." As discussed in the ACPI 2.0 specification for the _STA status method of a device, the _STA (status) object returns the status of a device, which can be one of the following: enabled, disabled, or removed. In this respect, in the result code (bitmap) bit 0 is set if the device is present; bit 1 is set if the device is enabled and decoding its resources; bit 2 is set if the device should be shown in the UI; bit 3 is set if the device is functioning properly (cleared if the device failed its diagnostics); bit 4 is set if the battery is present; and bits 5-31 are reserved. A device can only decode its hardware resources if both bits 0 and 1 are set. If the device is not present (bit 0 cleared) or not enabled (bit 1 cleared), then the device must not decode its resources. Bits 0, 1 and 3 are the "present, enabled and functioning" bits mentioned above. Firmware 15 utilizes an ACPI method 107 to trigger OS 11 to "check for" master processor 12A, thereby reintroducing the master processor 12A to OS 11. As a result of checking for master processor 12A, OS 11 will recognize that such master processor 12A is again available and will thus begin scheduling tasks for master processor 12A once again.

Exemplary techniques for recovering from a detected LOL that may be employed are described further in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference. Embodiments provided herein further discuss techniques for instructing a system's OS to idle a processor module for which LOL is detected. Embodiments provided herein do not require that the OS be implemented with processor-specific information to receive an instruction to idle the processor responsive to LOL being detected for the processor. That is, the OS is not required to be developed specifically for a certain processor architecture in order to receive an instruction from the system firmware to idle the processor. For instance in certain embodiments, standard OS methods, such as ACPI methods, are used for instructing the OS to idle the processor. Thus, in certain embodiments, any ACPI-compatible OS can receive an instruction to idle the processor module in the manner described herein. Thus, in accordance with certain embodiments an OS that is fully ACPI compliant can receive notification that a processor should have its use discontinued, responsive to detected LOL. Further, in certain implementations the OS can keep using the disabled processor until it is convenient to eject the processor and return it to firmware control.

FIG. 2 shows a block diagram of one embodiment of the above system 10, which is implemented for the IPF processor architecture and is labeled as system 10$_A$. The quintessential model of the traditional IPF architecture is given in the *Intel IA-64 Architecture Software Developer's Manual Volume 2: IA-64 System Architecture*, in section 11.1 *Firmware Model*, the disclosure of which is hereby incorporated herein by reference. Accordingly, in this example embodiment of system 10$_A$, firmware 15, labeled as firmware 15$_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

It should be noted that while the above description of PAL and SAL is specific to the IPF architecture, other architectures may include a "PAL" and "SAL" even though such firmware layers may not be so named or specifically identified as separate layers. In general, such a PAL layer may be included in a given system architecture to provide an interface to the processor hardware. The interface provided by the PAL layer is generally dictated by the processor manufacturer. Similarly, a SAL layer may be included in a given system architecture to provide an interface from the operating system to the hardware. That is, the SAL may be a system-specific interface for enabling the remainder of the system (e.g., OS, etc.) to interact with the non-processor hardware on the system and in some cases be an intermediary for the PAL interface.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system $10_A$ (recall that there may be many lockstep processor pairs 12) such that the processors begin executing concurrently through the same firmware.

After it has performed its duty of initializing the processor(s), PAL 201 passes control of system $10_A$ to SAL 202. It is the responsibility of SAL 202 to discover what hardware is present on the system platform, and initialize it to make it available for the OS 11. When main memory is initialized and functional, the firmware $15_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system $10_A$ by branching the boot processor into the entry point of such OS loader program.

The OS loader program then uses the standard firmware interfaces to discover and initialize system $10_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware $15_A$ is no longer in control of system $10_A$.

As OS 11 is initializing, it has to discover from the-firmware $15_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware $15_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" is provided, which is shown as device tree 203 in this example. Device tree 203 is stored in SRAM (Scratch RAM) on the cell, which is RAM that is reinitialized. Firmware 15A builds the device tree 203 as it discovers what hardware is installed in the system. Firmware then converts this information to the ACPI tables format and presents it to OS 11 so that OS 11 can know what is installed in the system. The ACPI device tables (not shown) are only consumed by OS 11 at boot time, so they are never updated as things change. For OS 11 to find the current status, it calls an ACPI "method" to discover the "current status". The _STA method described above is an example of such an ACPI method. When _STA is called, the AML can look for properties on the device specified in the firmware device tree and convert that into the Result Code bitmap described above. So, if lockstep has been lost on a processor, firmware 15A will set the device tree property that indicates loss of lockstep, then when OS 11 calls _STA for that device, the "lockstep lost" property directs the AML code to return to "0" in the "functioning properly" bit so that OS 11 can know there is a problem with that processor.

A simple example of device tree 203 is shown below in Table 1:

TABLE 1

| Device | Status | Lockstep Enabled |
|---|---|---|
| Processor A | Present, Enabled, and Functioning | Yes |

As mentioned above, once LOL is detected for a processor module, it becomes desirable to notify the system's OS that the processor module is running without lockstep. This notification will allow the OS to stop using the processor, release any resources that may be associated with the processor, and return the processor to firmware control so that there is no further opportunity for silent data corruption problems to occur on the processor module that no longer has lockstep protection. Exemplary embodiments are provided herein in which system firmware (e.g., SAL) notifies the OS that lockstep has been lost and the processor should be returned to firmware control. More specifically, exemplary embodiments are provided herein in which system firmware, responsive to detection of LOL for a processor module, instructs the OS to idle the processor module and return control of the processor module to the system firmware.

FIG. 3 shows an exemplary operational flow diagram of system firmware according to one embodiment for instructing the OS to idle a processor module for which LOL is detected. This may be thought of as notifying the OS of the LOL detected for the processor module, but in certain embodiments the LOL is not actually notified of the LOL but is instead instructed to idle the processor module and return control over the processor module to the system firmware (without the OS knowing the reason for doing so). As shown, the "Notify OS" procedure of the system firmware is entered in block 301 responsive to detection of LOL for a processor module, such as processor module 12 of FIGS. 1-2. In operational block 302, SAL sets a property in the firmware device tree indicating that lockstep has been lost and an eject is being requested. In this manner, the system firmware leaves itself a "clue" that the processor has lost lockstep so that when the processor is returned to firmware control (after instructing the OS to idle the processor), the system firmware knows why it has control of the processor. So, in block 302, a property is set in the firmware device tree that indicates lockstep has been lost for this processor module and firmware is requesting that the CPU be ejected and returned to firmware control.

In operational block 303, SAL asserts a General Purpose Event Interrupt (GPE) by writing to the appropriate GPE register in the ACPI register space. This causes the OS to execute its interrupt handler, which will run an ACPI Machine Language (AML) Method associated with this particular interrupt. In this example, this AML method that is executed responsive to the interrupt generated by the GPE includes an AML instruction called "Notify". This "Notify" operation indicates the CPU object that has lost lockstep (i.e., identifies which processor module lost its lockstep) and that an Eject is being requested as arguments. The AML instruction notifies the OS that action is being requested on this CPU. The AML method then returns and the OS can take action asynchronously to satisfy the notify request. Exemplary actions that can be taken to idle the processor module responsive to this request and then attempt to reestablish lockstep for the processor module are described further in concurrently filed and commonly assigned U.S. patent application Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED", the disclosure of which is hereby incorporated herein by reference.

In operational block 304, the system firmware restores the saved state and resumes the previous context. When an LOL is detected, an MCA (Machine Check Abort) is generated. As soon as the MCA is generated, the "state" of the processor is saved. That means all of the control registers, stack and RSE pointers are moved to a storage area (both memory and extra registers in the processor) so that the application that was running on the processor can be resumed later on. The MCA is processed and then all of the stored pointers and registers are reloaded to exactly what their values were when the MCA occurred. The system firmware calls PAL_MC_RESUME, which triggers PAL to correct the internal state of the processor. That is, PAL_MC_RESUME then instructs the processor to return to the exact instruction that was executing when the MCA occurred and begin executing again.

The processor module, returns to normal execution without lockstep protection in operational block 305. That is, the processor module executes normally until the OS idles/ejects it. Before restoring the execution state and calling $PAL_{13}$ $MC_{13}$ RESUME, firmware evaluates the error that occurred. If there is any chance of data corruption propagating throughout the system, then the exemplary process of FIG. 3 is not followed. For instance, if determined in block 101 of FIG. 1 that the lockstep is not recoverable, then the system crashes in block 102. The exemplary operational flow of FIG. 3 is performed in operational block 103 (of FIG. 1) of this embodiment. Exemplary techniques for deciding whether to attempt to reestablish lockstep for the processor module (and thus whether to request that the OS idle the processor and in the meantime resume operation of the processor) are described further in concurrently filed and commonly assigned U.S. patent application Ser. No. 10/972,835 titled "SYSTEM AND METHOD FOR USING INFORMATION RELATING TO A DETECTED LOSS OF LOCKSTEP FOR DETERMINING A RESPONSIVE ACTION" and concurrently filed and commonly assigned U.S. patent application Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED", the disclosures of which are hereby incorporated herein by reference.

In view of the above, embodiments are provided in which system firmware requests that an OS idle a processor and return control over the processor to the system firmware. While specific examples are described above in which the system firmware requests that the OS idle a processor module responsive to detection of LOL for the processor module, embodiments hereof are not limited in application to instances in which LOL is detected for a processor. Rather, Rather, the embodiments described above for using system firmware for requesting that the OS idle a processor and return control over such processor to the system firmware may be utilized for a variety of different applications, including responsive to any processor errors that are not immediately fatal (such as the LOL errors discussed further below), maintenance of the processor, physically moving the processor module to a different system, power failures, etc. Thus, while idling a processor module responsive to detection of LOL is an application of particular advantage, the concept of utilizing the system firmware for causing the OS to idle a processor module and return control thereof to the system firmware is not intended to be limited to instances in which LOL is detected for the processor module, but may equally be applied in any other desired applications.

What is claimed is:

1. A method comprising:
   detecting loss of lockstep (LOL) for a processor module in a system;
   responsive to said detecting LOL for the processor module system firmware instructing the system's operating system to idle the processor module and return control over the processor module to the system firmware; and
   continuing operation of the processor module without lockstep protection, while awaiting for the operating system to idle the processor module and return control over the processor module to the system firmware.

2. The method of claim 1 further comprising:
   determining if the LOL is immediately fatal.

3. The method of claim 2 further comprising:
   performing said continuing operation if determined that the LOL is not immediately fatal.

4. The method of claim 3 further comprising:
   if determined that the LOL is immediately fatal, ceasing operation of the processor module.

5. The method of claim 1 further comprising:
   determining if lockstep can be recovered for the processor module without shutting down the system's operating system.

6. The method of claim 5 further comprising:
   performing said continuing operation if determined that lockstep can be recovered for the processor module without shutting down the system's operating system.

7. The method of claim 6 further comprising:
   ceasing operation of the processor module if determined that lockstep cannot be recovered for the processor module without shutting down the system's operating system.

8. The method of claim 1 further comprising:
   said operating system idling the processor module and returning control over the processor module to the system firmware.

9. The method of claim 8 further comprising:
   said system firmware reestablishing lockstep for the processor module, wherein said operating system is not shut down for said reestablishing.

* * * * *

UNITED STATES PATENT AND TRADEMARK OFFICE
CERTIFICATE OF CORRECTION

PATENT NO. : 7,356,733 B2
APPLICATION NO. : 10/972888
DATED : April 8, 2008
INVENTOR(S) : Scott L. Michaelis et al.

It is certified that error appears in the above-identified patent and that said Letters Patent is hereby corrected as shown below:

In column 11, line 45, delete "$PAL_{13}$ $MC_{13}$ RESUME" and insert -- PAL_MC_RESUME --, therefor.

In column 12, line 28, in Claim 1, insert -- , -- before "system".

Signed and Sealed this

Twenty-ninth Day of July, 2008

JON W. DUDAS
*Director of the United States Patent and Trademark Office*